United States Patent
Pillans

(10) Patent No.: US 9,418,404 B2
(45) Date of Patent: Aug. 16, 2016

(54) INFRARED DETECTOR SYSTEM AND METHOD

(71) Applicant: SELEX ES LTD, Basildon (GB)

(72) Inventor: Luke Alexander Pillans, Basildon (GB)

(73) Assignee: SELEX ES LTD., Essex (GB)

( * ) Notice: Subject to any disclaimer, the term of this patent is extended or adjusted under 35 U.S.C. 154(b) by 230 days.

(21) Appl. No.: 14/352,098

(22) PCT Filed: Oct. 18, 2012

(86) PCT No.: PCT/EP2012/070633
§ 371 (c)(1),
(2) Date: Apr. 16, 2014

(87) PCT Pub. No.: WO2013/057177
PCT Pub. Date: Apr. 25, 2013

(65) Prior Publication Data
US 2014/0267769 A1    Sep. 18, 2014

(30) Foreign Application Priority Data

Oct. 18, 2011    (GB) .................................. 1117975.1

(51) Int. Cl.
*H04N 5/00*    (2011.01)
*G06T 5/00*    (2006.01)
(Continued)

(52) U.S. Cl.
CPC    *G06T 5/002* (2013.01); *H04N 5/33* (2013.01); *H04N 5/3675* (2013.01)

(58) Field of Classification Search
CPC ........... H04N 5/33; H04N 5/332; H04N 3/09; H04N 5/217; H04N 5/3675; H04N 9/64; H04N 5/367; H04N 9/045; H04N 5/335; H04N 5/2354; H04N 9/09; H04N 5/353; H04N 2209/048; G01J 5/02; G01J 2005/0077; G09G 5/00; H01L 31/00; G06F 3/0308; G06F 3/0325; G06K 9/40; G06T 5/002
See application file for complete search history.

(56) References Cited

U.S. PATENT DOCUMENTS

2002/0067341 A1* 6/2002 Kobayashi ............ G06F 3/0325
345/157
2003/0146975 A1* 8/2003 Joung .................. H04N 5/3675
348/164

(Continued)

FOREIGN PATENT DOCUMENTS

CN    102184525 A    9/2011
JP    2002-344814 A    11/2002

(Continued)

OTHER PUBLICATIONS

International Search Report (PCT/ISA/210) mailed on Dec. 14, 2012, by the European Patent Office as the International Searching Authority for International Application No. PCT/EP2012/0706933.

*Primary Examiner* — Jay Patel
*Assistant Examiner* — Frank Huang
(74) *Attorney, Agent, or Firm* — Buchanan Ingersoll & Rooney PC

(57) ABSTRACT

An infrared detector system is described in which a despeckle filter is applied to image data generated by a High Operating Temperature (HOT) detector array. The filter reads the data associated with each pixel of the image generated and compares it with selected neighboring pixels. The comparison yields a series of values that are compared to predetermined thresholds and the pixel is scored according to the number of values that exceed the threshold set. The score assigned to the pixel then determines the treatment of the pixel in the image to be generated. The data value of the pixel may be ignored, included or substituted with an alternative calculated value.

18 Claims, 3 Drawing Sheets

(51) Int. Cl.
 *H04N 5/33* (2006.01)
 *H04N 5/367* (2011.01)

(56) References Cited

U.S. PATENT DOCUMENTS

2007/0291142 A1* 12/2007 Noh .................. H04N 5/367
 348/246
2009/0059046 A1* 3/2009 Hasegawa ............ H04N 5/2354
 348/296
2011/0158554 A1* 6/2011 Uemura ................... G06K 9/40
 382/275
2013/0155249 A1* 6/2013 Neeley ..................... H04N 5/33
 348/159

FOREIGN PATENT DOCUMENTS

| | | |
|---|---|---|
| JP | 2006-319602 A | 11/2006 |
| JP | 2007-300191 A | 11/2007 |
| WO | WO 2007/083252 A1 | 7/2007 |

* cited by examiner

INFRARED DETECTOR SYSTEM AND METHOD

This invention relates to an infrared (IR) detector system and method. More specifically, but not exclusively, it relates to an IR detector system including a filter for identifying and removing the effects of deviant pixels in a High Operating Temperature (HOT) detector from an image generated by said detector.

When running IR detectors at higher temperatures one of the most significant problems is the occurrence of 1/f and bimodal type defects which are not readily identified and concealed using static defect maps. These are manifest as individual bright and dark pixels In an image generated and sometimes referred to as "salt and pepper" noise.

Existing systems often include filters that are not optimised for HOT operation of IR detectors. For example, static defect maps are ineffective as a method of removing such noise from images generated.

It is known that HOT IR detectors show noise behaviours that benefit from specifically optimised techniques primarily because defects can evolve with time. There are existing techniques that have been adapted to meet these specific characteristics of HOT detectors.

According to the present invention there is provided an IR detector system comprising a High Operating Temperature array of pixels and a filter, the filter being optimised for High Operating Temperature of the detector array, the filter comprising a reading portion for reading the array size, a selection portion for selecting the pixel under test and a number of surrounding pixels, a comparison portion for comparing the selected pixel to each neighbouring pixel and generating a score representative of the condition of the selected pixel, a counting portion for counting the score of the selected pixel; and an averaging portion for taking a mean average score of each surrounding pixel of the selected pixel such that noise generated by the detector array and included in the image data is substantially removed.

According to the invention there is also provided a method of reducing the appearance of deviant pixels in infrared imagery from High Operating Temperature detectors comprising the step of inputting data representative of an image of a scene in to a filter, the filter being optimised to substantially remove noise cause by the effects of defective pixels in the detector, the filtering comprising the following steps: reading the array size, sequentially stepping through each pixel of the detector array and selecting a pixel to test and a number of surrounding pixels; comparing the selected pixel to each surrounding pixel selected; generating a value for each surrounding pixel based on the comparison between the selected pixel and each neighbouring pixel, comparing the score of each neighbouring pixel to a predetermined threshold value, counting the number of neighbouring pixels exceeding the threshold value; including or excluding the selected pixel in the image data accordingly; and repeating all of the above steps for the next selected pixel until all of the pixels have been stepped through.

In this way, the bright and dark pixels of noise occurring in the image can be removed and the image quality improved.

The invention will now be described with reference to the following diagrammatic drawings in which.

A detector system according to a first embodiment of the invention comprises a HOT IR detector including a filter for reducing noise in an image generated by the detector, the image comprising a series of pixels.

The filter examines the four closest pixels surrounding each pixel in an image; above, below, left, and right. The value of the centre pixel is subtracted from each adjacent pixel to give a delta for each neighbour. The delta values are compared against two symmetrically distributed threshold levels, for example; >20 and <(−20). The number of pixels exceeding each threshold is counted. If either count is 3 or more the pixel is declared noisy and is mapped out, or removed from the image.

It should be noted that one threshold, either positive or negative, must be broken for three or four neighbouring pixels. Two pixels breaking the positive threshold and two breaking the negative threshold does not count. When a pixel is declared noisy it is substituted with a value determined by examining the four surrounding pixels. To determine the substitution value the surrounding pixels are first clipped to a range determined by the scene contrast. The mean of the clipped values is used for substation.

Figure 1A:
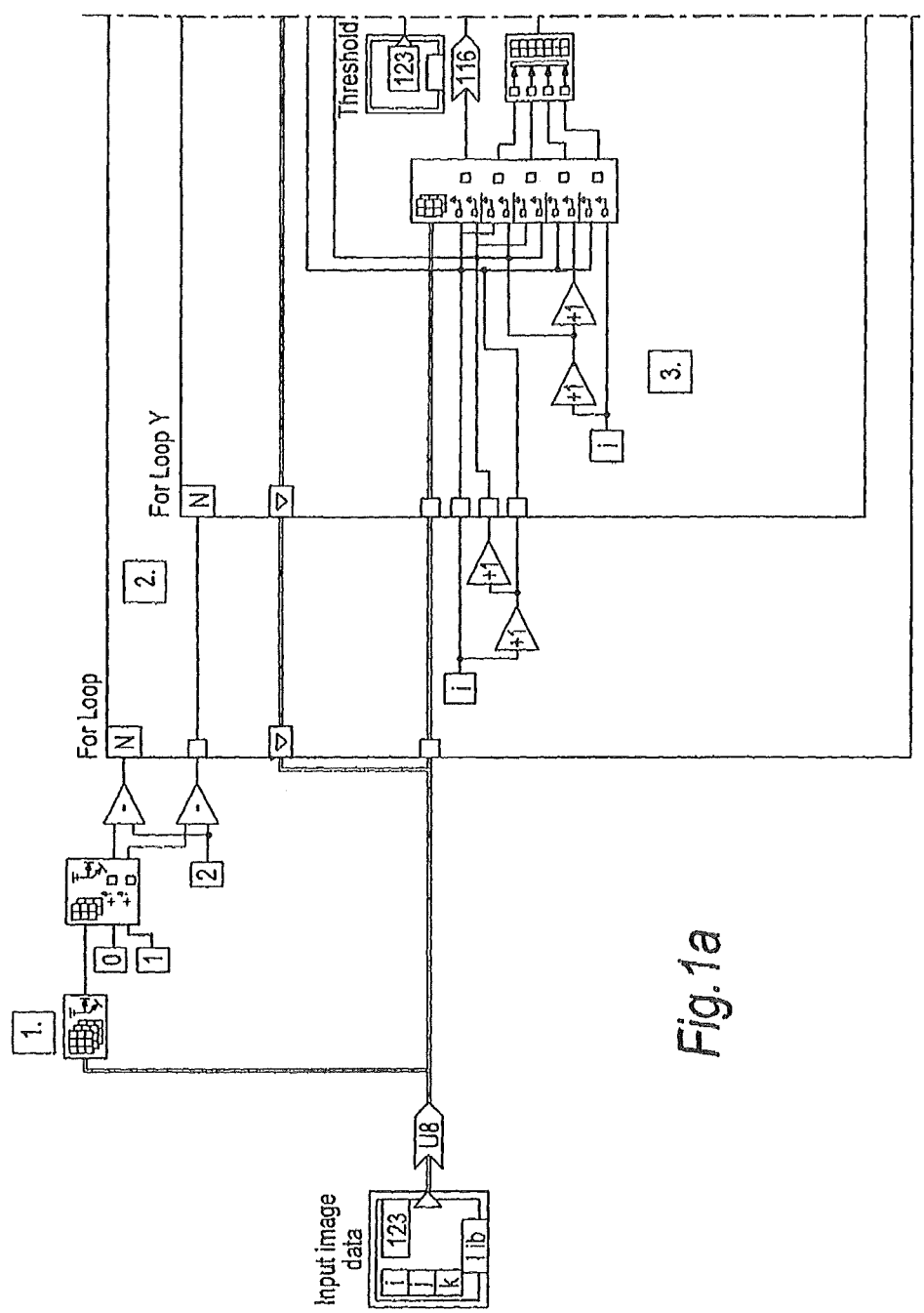
FIG. 1 is a Labview software implementation of one form of filter in an IR detector system in accordance with one form of the invention, showing decisions made with reference to pixel data and threshold values.
Figure 1B:
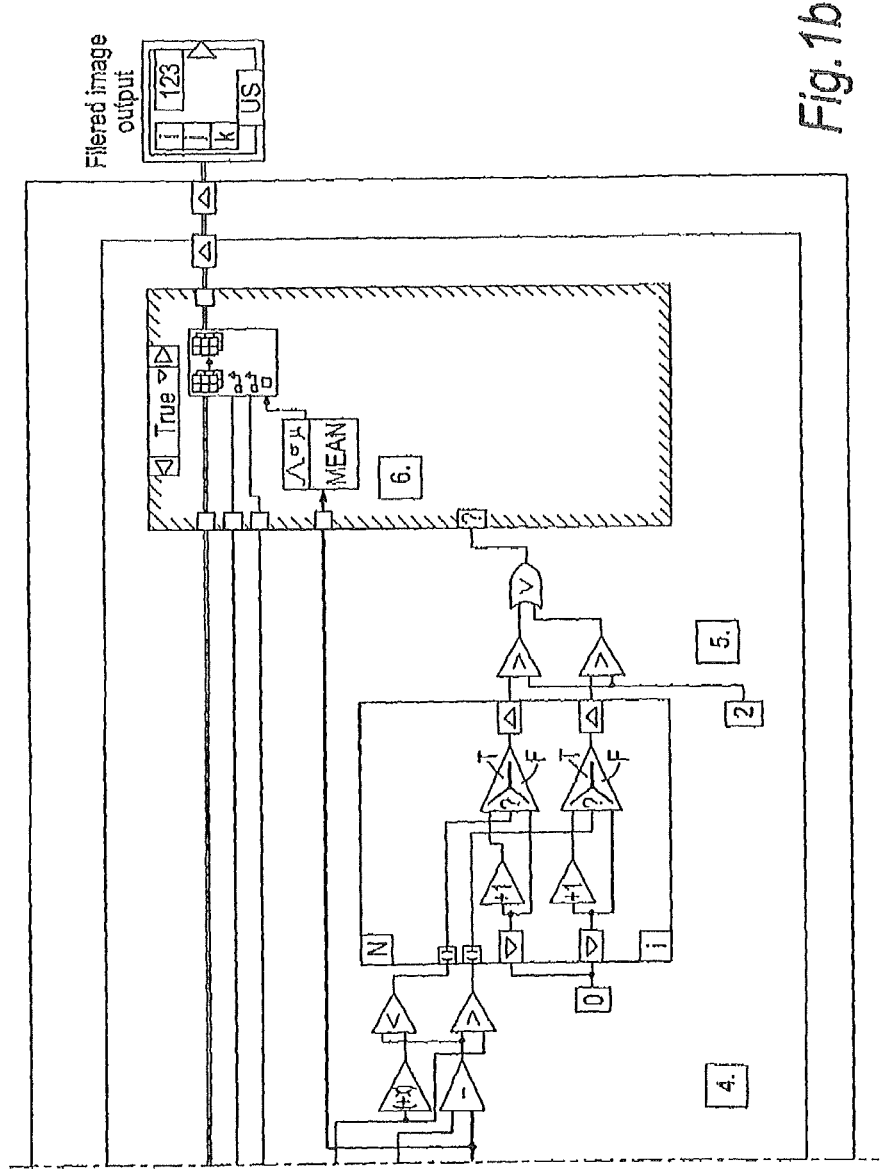

A filter according to the invention is shown in FIG. 1. The filter was implemented in Labview which was used to produce the Images shown in FIGS. 2 and 3. The code used by the filter is given in FIG. 1. Image data is input in to the filter from a detector array (not shown) and filtered image data is output for further processing to create an Image such as that shown in FIG. 3. The filter comprises two main sections 1 and 2. The first section 1, roads the array size and sets up 'for-loops'. The second section 2 comprises two loops, X and Y, which step through each pixel of the detector array. Loop Y further comprises four subsections 3, 4, 5, 6. Subsection 3 selects the pixel under test and the four surrounding pixels; subsection 4 compares the pixel to each neighbouring pixel; subsection 5 counts the score of the pixel; and subsection 6 takes a mean average of each surrounding pixel, the ranges in this example having already been clipped by the conversion to 8-bit values. The Y-loop outputs a filtered output image such as that shown in FIG. 3.

The filter described above is not computationally intensive and so is suitable for real time imaging. Furthermore, it will be appreciated that this filter could be implemented using hardware or software within a portable system without using excessive space or power consumption.

In one form of the invention, the substitution value clipping is performed automatically by virtue of the fact that the image range has already been converted from 16-bit per pixel down to 8-bits per pixel.

In one form of the present invention, the filter is a rank selection, non-linear filter. A non-linear filter is one in which the effect is not directly proportional to the input parameters, in many cases the non-linearity takes the form of a threshold within which the filter has no effect. This kind of filter is useful when trying to remove defective data from an image without degrading image detail. A rank selection filter is a class of non-linear filters which involve examining where each pixel lies within the local distribution. This filter is a form of rank selection filter. Substitution is not based on a ranking method; instead it uses a mean average of clipped values.

The threshold used for selection can be chosen according to the application. In the first instance the value should be set according to the maximum contrast possible given the modulation transfer function (MTF) of the imaging system including the lens. The threshold value can then be reduced to further improve the image quality at the possible expense of some lost detail. A clipping range can be selected to best preserve image detail when false detection occurs, adjusting the clipping range according to current scene contrast yields good results.

What follows is a first worked example of the steps employed by the filter.

The first step of this filter can be thought of as applying four simple convolution matrices:

1.
| 0 | 1 | 0 |
|---|---|---|
| 0 | −1 | 0 |
| 0 | 0 | 0 |

2.
| 0 | 0 | 0 |
|---|---|---|
| 1 | −1 | 0 |
| 0 | 0 | 0 |

3.
| 0 | 0 | 0 |
|---|---|---|
| 0 | −1 | 1 |
| 0 | 0 | 0 |

4.
| 0 | 0 | 0 |
|---|---|---|
| 0 | −1 | 0 |
| 0 | 1 | 0 |

Each convolution result is examined separately against two values, for example +20 and −20. It should be appreciated that the values may be selected at a different level and that any suitable value may be used. The full process for a single pixel is further described below.

The table below titled "image data" shows the pixel values for a single pixel of interest and its four neighbouring pixels. This example uses an 8 bit scale with 255 being hot and 0 being cold, although these values are not limiting and any suitable values may be substituted without detracting from the principle of the invention. Neighbouring pixels that exceed the hot threshold are shaded and those which exceed the cold threshold are not.

Image data

|  | 130 |  |
|---|---|---|
| 180 | 100 | 60 |
|  | 200 |  |

Application of the convolution matrices yields convolution results in the following form:

|  | 30 |  |
|---|---|---|
| 80 |  | −40 |
|  | 100 |  |

Applying the two separate thresholds yields the following table of results:

| Hot threshold (>20) | | Cold threshold (<20) | |
|---|---|---|---|
|  1  |  | 0 |  |
|  1  | 0 | 0 | 1 |
|  1  |  | 0 |  |

Hot score = 3
Cold score = 1

Accordingly, it can be determined that this pixel is noisy, on account of the hot score, it will be replaced with the mean of [130, 180, 60, 200], which is 143.

The following are different examples of numerical pixel results and the resulting hot and cold scores for the individual pixels in the centre of the grid when using the convolutions matrices described above.

Examples of pixels determined to be noisy:

|  | 130 |  |
|---|---|---|
| 180 | 100 | 105 |
|  | 200 |  |

Hot score = 3,
cold score = 1

|  | 70 |  |
|---|---|---|
| 130 | 100 | 50 |
|  | 60 |  |

Hot score = 1,
cold score = 3

Examples of pixels determined to be 'not noisy':

|  | 105 |  |
|---|---|---|
| 130 | 100 | 103 |
|  | 200 |  |

Hot score = 2,
cold score = 0

|  | 60 |  |
|---|---|---|
| 130 | 100 | 50 |
|  | 200 |  |

Hot score = 2,
cold score = 2

Figure 2:
FIG. 2 is an image taken with an IR detector system without the filter of FIG. 1.
Figure 3:
FIG. 3 is the image of FIG. 2 with the filter of FIG. 1 applied.

The image in FIG. 2 was captured with a detector running at 160K. The image has 2 point correction applied and no dead element concealment. A defect map generated in the usual way was not able to remove all of the defects from the image, but the despeckle filter described above removes virtually all point and paired defects from the image without degrading the image detail, generating the image in FIG. 3. Areas of fine detail, such as the railings, tree branches and the small birds standing around the puddles are all still visible in the filtered image. These are the kind of details which can be lost when poorly tuned de-noising filters are applied.

In summary, the filter uses threshold detection on a local area kernel to identify pixels whose value does not accurately represent scene content. The threshold method used is designed to handle the density and nature of defects seen in HOT detectors. Once defects are identified a substitution method is used which disguises defective pixels but preserves scene content in instances where false defection has occurred. This substitution method involves clipping the value of surrounding pixels before averaging.

It will be appreciated that the data values and threshold values used in the embodiments above are examples only and that any suitable values may be used that fulfil the requirements of the individual imaging system.

Furthermore, it will be appreciated that the invention may be used in association with other forms of detectors and is not limited to use with IR radiation and IR detectors.

The invention claimed is:

1. An IR detector system comprising:
a High Operating Temperature detector pixel array; and
a filter for filtering noise from the data generated by the detector pixel array, the filter including:
a reading portion for reading a size of the pixel array;
a selection portion for selecting a pixel under test and a number of surrounding pixels;
a comparison portion for comparing data representative of the selected pixel to each surrounding pixel and generating a score based on a first threshold value and a second threshold value, the score being representative of a condition of the data representative of the selected pixel for each surrounding pixel;
a counting portion for counting the score of the selected pixel for each surrounding pixel; and
an averaging portion for taking a mean average score of each surrounding pixel of the selected pixel such that noise generated by the detector pixel array and included in image data of the detector pixel array is substantially removed.

2. The IR detector system according to claim 1, in which the filter comprises a non-linear, rank selection filter.

3. The IR detector system according to claim 1, in which the number of the surrounding pixels selected is four and the comparison between the selected pixel and the four surrounding pixels comprises subtracting a value of the selected pixel from values of the surrounding pixels and comparing these values to one of the first threshold value and the second threshold value.

4. The IR detector system according to claim 3, in which the selected pixel is scored based on the number of the surrounding pixels that exceed the first and second threshold values and the data representative of the selected pixel is substituted based on the score generated for that pixel.

5. The IR detector system according to claim 4, in which the substitution comprises, removal of the data point relevant to the selected pixel and replacing it with a data point generated by the average data value of the surrounding pixels.

6. The IR detector system according to claim 1, in which a substituted value is assigned to the selected pixel.

7. A method of reducing the effects of deviant pixels in infrared images generated by High Operating Temperature detector pixel arrays, comprising the steps of:
generating an image of a scene; and
inputting data representative of the image of the scene into a filter, in which the filtering includes the steps of:
reading a size of the detector pixel array;
sequentially stepping through the data associated with each pixel of the detector pixel array and selecting a pixel to test and a number of surrounding pixels;
comparing the selected pixel to each surrounding pixel selected;
generating a value for each surrounding pixel based on the comparison between the selected pixel and each surrounding pixel;
comparing the value of each surrounding pixel to one of a first predetermined threshold value and a second predetermined threshold value;
counting a number of the surrounding pixels exceeding the first and second threshold values;
generating a score for the selected pixel;
including, excluding or substituting an alternative value for the selected pixel based on the score; and
repeating all of the above steps for the next selected pixel until all of the pixels in the detector pixel array have been stepped through.

8. The method according to claim 7, further comprising the step of generating an alternative value for the selected pixel based on an average data value of the surrounding pixels and substituting that value for the actual data value for the selected pixel in the image.

9. The IR detector system according to claim 2, in which the number of surrounding pixels selected is four and the comparison between the selected pixel and the four surrounding pixels comprises subtracting the value of the selected pixel from the values of the surrounding pixels and comparing these generated values to one of the first and second predetermined threshold values.

10. The IR detector system according to claim 9, in which the selected pixel is scored based on the number of surrounding pixels that exceed the first and second predetermined threshold values and the data representative of the selected pixel is substituted based on the score generated for that pixel.

11. The IR detector system according to claim 10, in which the substitution comprises, removal of the data point relevant to the selected pixel and replacing it with a data point generated by the average data value of the surrounding pixels.

12. The IR detector system according to 2, in which a substituted value is assigned to the selected pixel.

13. The IR detector system according to 3, in which a substituted value is assigned to the selected pixel.

14. The IR detector system according to 4, in which a substituted value is assigned to the selected pixel.

15. The IR detector system according to 5, in which a substituted value is assigned to the selected pixel.

16. The IR detector system according to 9, in which a substituted value is assigned to the selected pixel.

17. The IR detector system according to 10, in which a substituted value is assigned to the selected pixel.

18. The IR detector system according to 11, in which a substituted value is assigned to the selected pixel.

* * * * *